(12) United States Patent
Kawasaki et al.

(10) Patent No.: US 7,533,932 B2
(45) Date of Patent: May 19, 2009

(54) SLIDE ADJUSTER FOR AN AUTOMOBILE SEAT

(75) Inventors: Seiji Kawasaki, Hiroshima (JP); Etsunori Fujita, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 405 days.

(21) Appl. No.: 11/411,103

(22) Filed: Apr. 26, 2006

(65) Prior Publication Data
US 2006/0255582 A1 Nov. 16, 2006

(30) Foreign Application Priority Data
May 13, 2005 (JP) .............................. 2005-141467

(51) Int. Cl.
*B60N 2/42* (2006.01)
*A47C 1/00* (2006.01)
*B60R 21/00* (2006.01)

(52) U.S. Cl. .................. 297/216.1; 297/344.1; 297/468
(58) Field of Classification Search ............... 297/344.1, 297/216.1, 463.1, 470, 471, 472, 464, 468, 297/216.18; 248/429
See application file for complete search history.

(56) References Cited

U.S. PATENT DOCUMENTS

| 4,676,556 | A | * | 6/1987 | Yamanoi et al. | ............ 297/473 |
| 4,818,022 | A | * | 4/1989 | Nishimura | .................. 297/473 |
| 4,940,285 | A | * | 7/1990 | Suzuki et al. | ................ 297/473 |
| 5,137,244 | A | | 8/1992 | Negi | |
| 5,575,449 | A | * | 11/1996 | Shinbori et al. | ............. 248/429 |

FOREIGN PATENT DOCUMENTS

| JP | 10-297327 | 11/1998 |
| KR | 1998-021554 | 7/1998 |

\* cited by examiner

*Primary Examiner*—Milton Nelson, Jr.
(74) *Attorney, Agent, or Firm*—Wenderoth, Lind & Ponack, L.L.P.

(57) ABSTRACT

An automobile slide adjuster includes a lower rail to be secured to a vehicle body, an upper rail slidably mounted on the lower rail, a seat belt, a seat belt holding plate secured to the upper rail and having a seat belt anchor formed therewith to hold one end of the seat belt, and a reinforcing plate mounted to the lower rail to reinforce the seat belt holding plate.

4 Claims, 5 Drawing Sheets

US 7,533,932 B2

SLIDE ADJUSTER FOR AN AUTOMOBILE SEAT

BACKGROUND OF THE INVENTION

1. Field of the Invention

The present invention relates generally to a slide adjuster for use in adjusting the position of an automobile seat in a direction longitudinally of a vehicle body and, in particular but not exclusively, to a reinforcing structure for a slide adjuster having a seat belt anchor mounted therein.

2. Description of the Related Art

Some automobile slide adjusters include a seat belt anchor, and such slide adjusters have a predetermined strength so that when a large load is applied to an upper rail from a seat belt through the seat belt anchor, the upper rail may not be separated from a lower rail.

In some automobile slide adjusters, a stopper attached to a front portion of the upper rail is held in contact with a leg of the lower rail, while a striker secured to a vehicle floor is inserted in a recess defined in a rear end portion of the upper rail.

Document 1: Japanese Laid-Open Patent Publication No. 10-297327

However, if the former slide adjuster is incorporated into a one-box car or mini van, a truck or the like, in which the distance between the floor and the seat is relatively short, various component parts constituting the slide adjuster must have an increased thickness to ensure a predetermined strength, resulting in an increase in the weight of the slide adjuster.

On the other hand, the slide adjuster as disclosed in Document 1 cannot be applied to a seat such as a driver's seat or a seat next to the driver, the position of which can be appropriately altered depending on a seat occupant.

SUMMARY OF THE INVENTION

The present invention has been developed to overcome the above-described disadvantages.

It is accordingly an objective of the present invention to provide a slide adjuster for an automobile seat capable of effectively increasing the strength of separation between a seat belt anchor and a rail with a relatively small space while limiting the increase of weight to a slight degree.

In accomplishing the above and other objectives, the automobile slide adjuster according to the present invention includes a lower rail to be secured to a vehicle body, an upper rail slidably mounted on the lower rail, a seat belt, a seat belt holding plate secured to the upper rail and having a seat belt anchor formed therewith to hold one end of the seat belt, and a reinforcing plate mounted to the lower rail to reinforce the seat belt holding plate.

This construction can effectively increase the strength of separation between the seat belt anchor and the rail with a relatively small space without increasing the thickness of the lower rail or the upper rail.

The automobile slide adjuster also includes an auxiliary rail joined to the seat belt holding plate and an auxiliary rail guide held by the reinforcing plate and having a guide groove defined therein, wherein a portion of the auxiliary rail is loosely inserted in the guide groove in the auxiliary rail guide.

The automobile slide adjuster further includes a belt mounted to the reinforcing plate and a belt guide secured to the seat belt holding plate to guide the belt.

The automobile slide adjuster further includes a guide support secured to the reinforcing plate to support the auxiliary rail guide and a guide support holding member secured to the seat belt holding plate to hold the guide support.

The guide support holding member is positioned laterally outwardly of the belt guide.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on an application No. 2005-141467 filed May 13, 2005 in Japan, the content of which is herein expressly incorporated by reference in its entirety.

Figure 1:
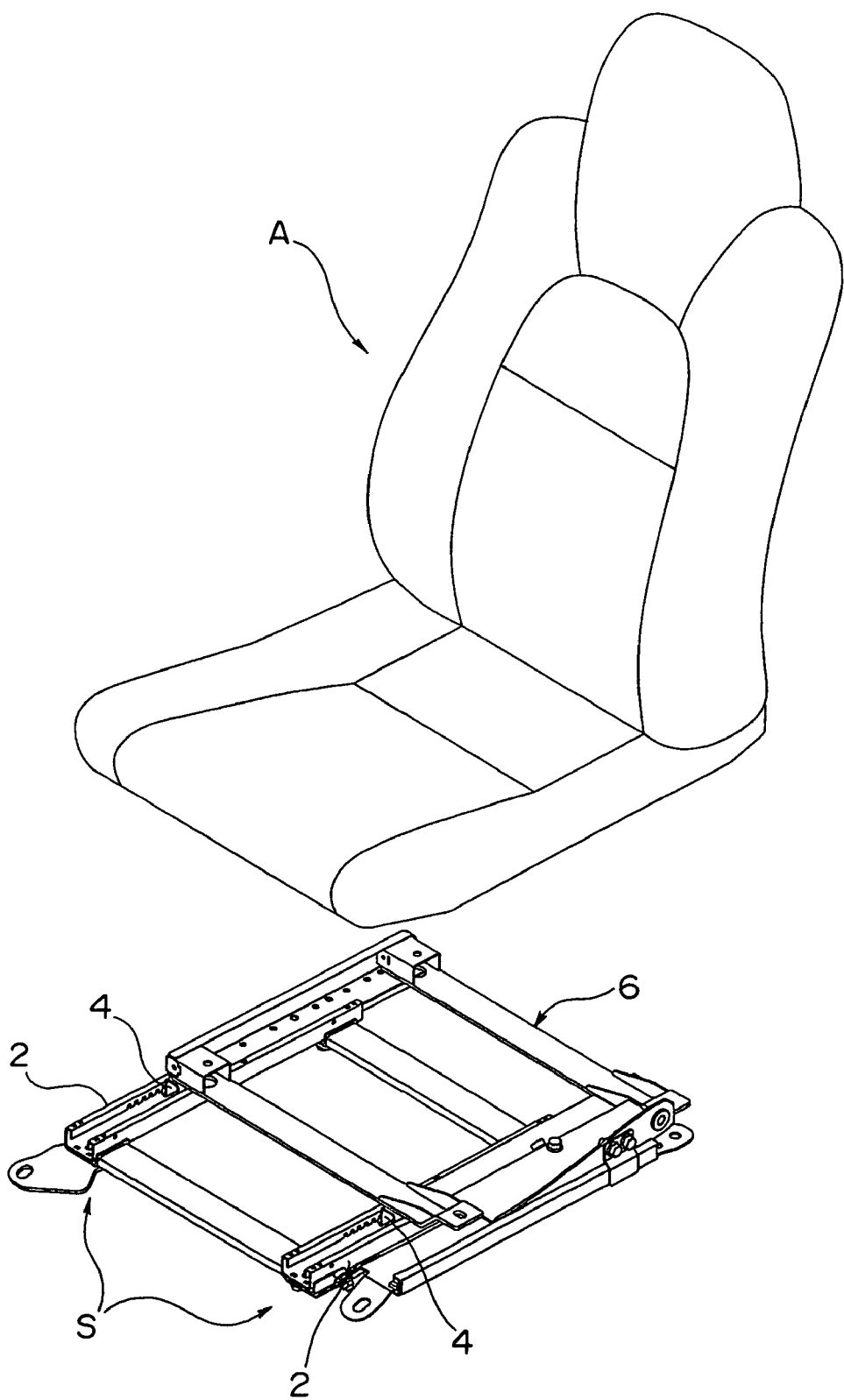
FIG. 1 is an exploded perspective view of an automobile seat with a slide adjuster according to the present invention.
Figure 2:
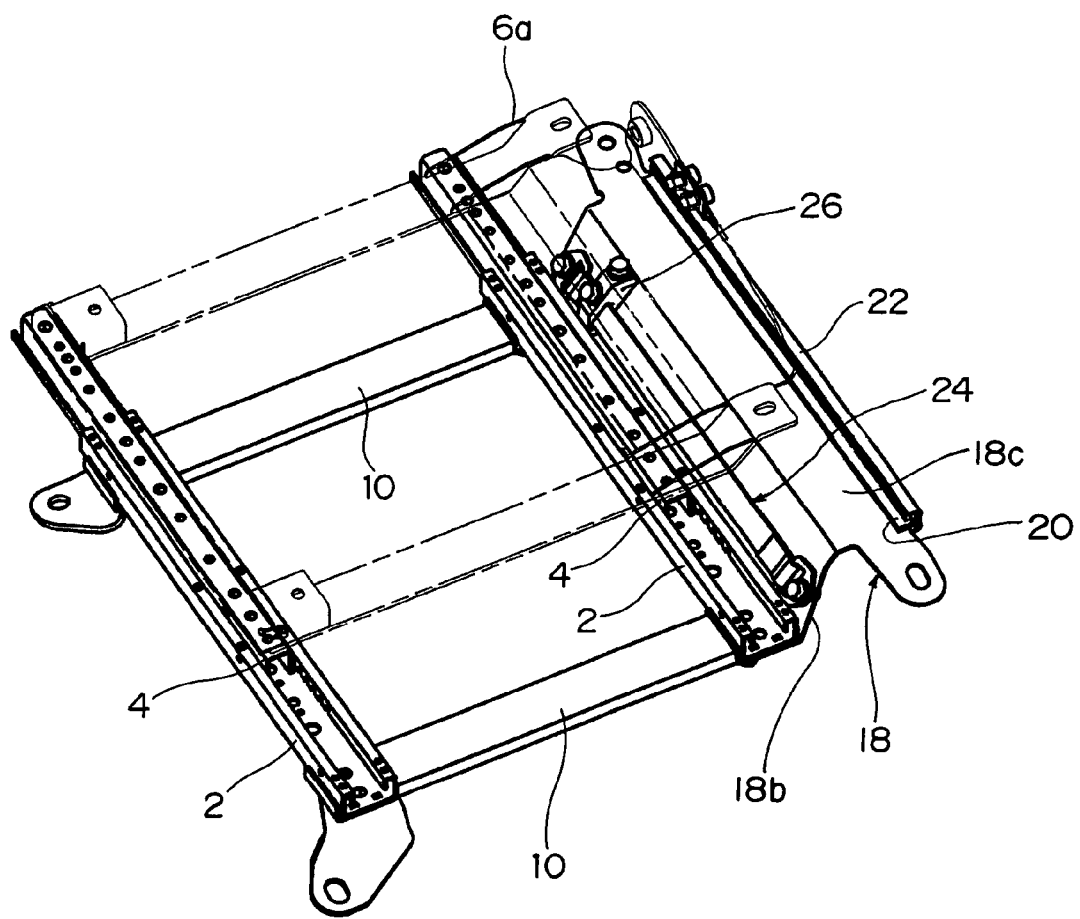
FIG. 2 is a perspective view of the slide adjuster according to the present invention.
Figure 3:
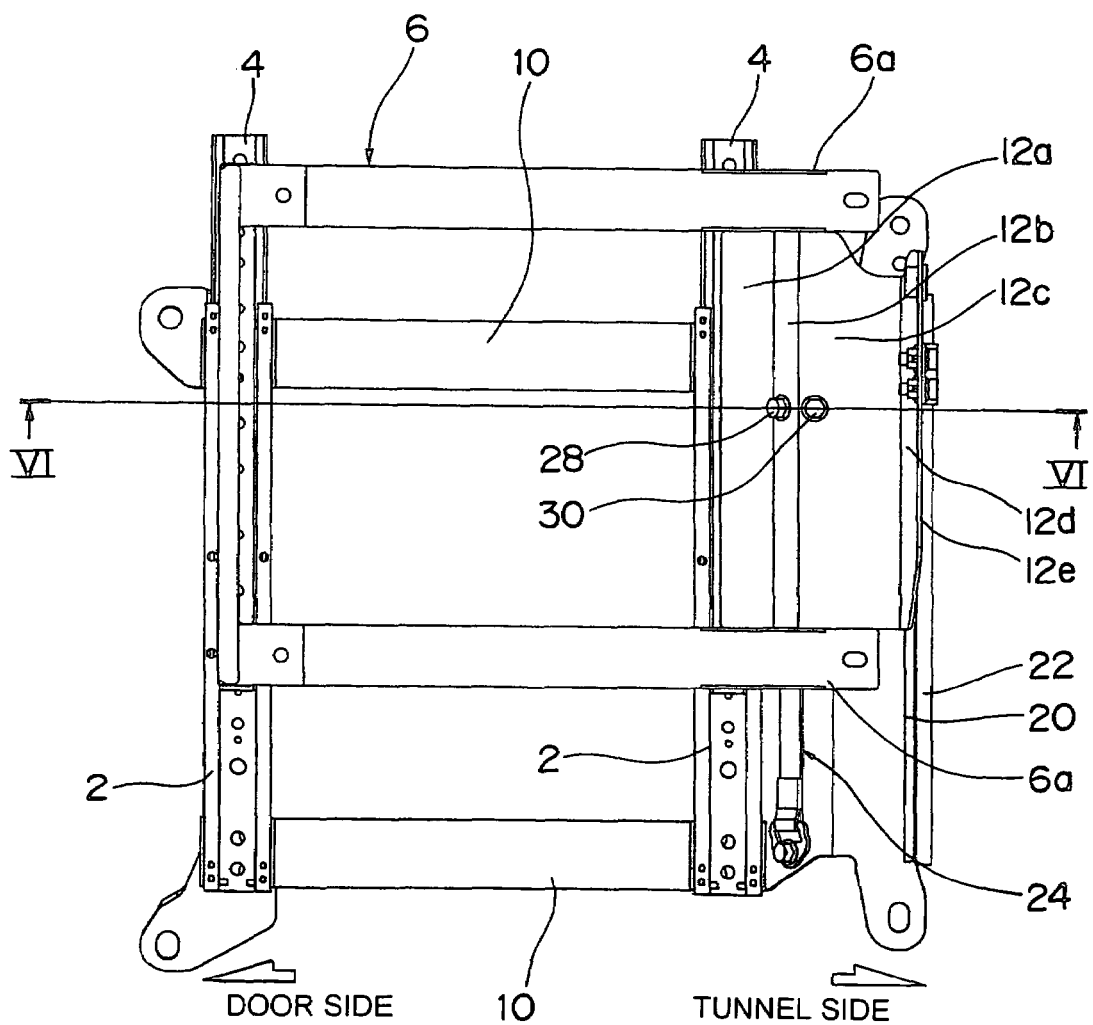
FIG. 3 is a top plan view of the slide adjuster of FIG. 2.

Referring now to the drawings, there is shown in FIG. 1 an automobile seat A provided with a slide adjuster according to the present invention. The slide adjuster includes a pair of slide adjuster units S disposed on respective sides of the seat A for use in adjusting the position of the seat A in the longitudinal direction of a vehicle body.

As shown in FIGS. 1 to 5, each slide adjuster unit S includes a lower rail 2 extending in the longitudinal direction of the vehicle body and rigidly secured to a vehicle floor, and also includes an upper rail 4 mounted on the lower rail 2 so as to be slidable relative thereto. A generally rectangular seat mounting frame 6 is joined to the right and left upper rails 4, and the seat A is mounted on the seat mounting frame 6.

The lower rail 2 has a cross section generally in the form of a figure "U" and is held by a U-shaped channel 8. The right and left U-shaped channels 8 are connected to each other by front and rear connecting members 10. On the other hand, the upper rail 4 has a cross section generally in the form of an inverted figure of "U", and the seat mounting frame 6 has front and rear overhangs 6a extending laterally outwardly towards a central portion of the vehicle body.

A seat belt holding plate 12 has a horizontally extending inner side portion 12a, which is joined to an upper surface of one of the right and left upper rails 4 that is positioned on the central side (tunnel side) of the vehicle body. The seat belt holding plate 12 also has a first inclined portion 12b extending laterally outwardly and obliquely upwardly from the inner side portion 12a, a horizontally extending medial portion 12c extending laterally outwardly from the first inclined portion 12b, a second inclined portion 12d extending laterally outwardly and obliquely upwardly from the medial portion 12c, and a vertical portion 12e extending upwardly from the second inclined portion 12d. The vertical portion 12e has a seat belt anchor 14 formed therewith.

Figure 4:
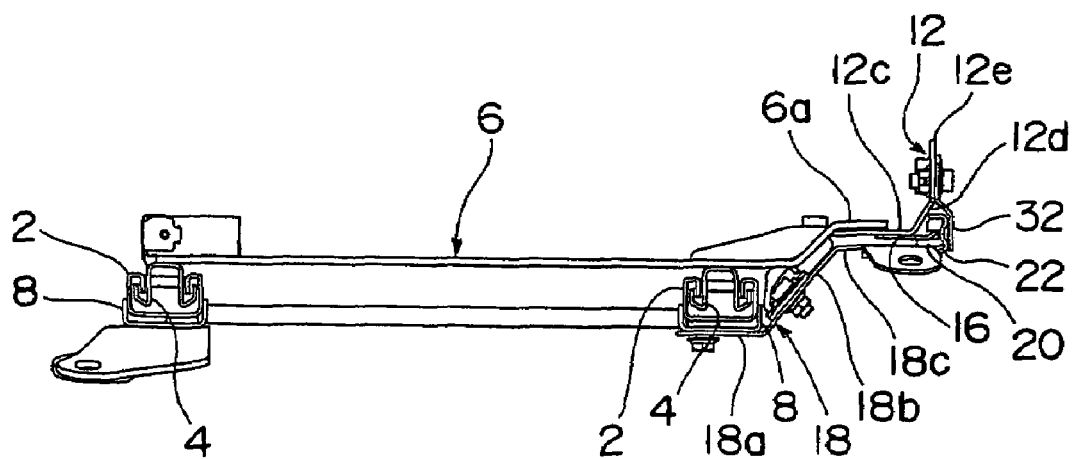
FIG. 4 is a front view of the slide adjuster of FIG. 2.
Figure 5:
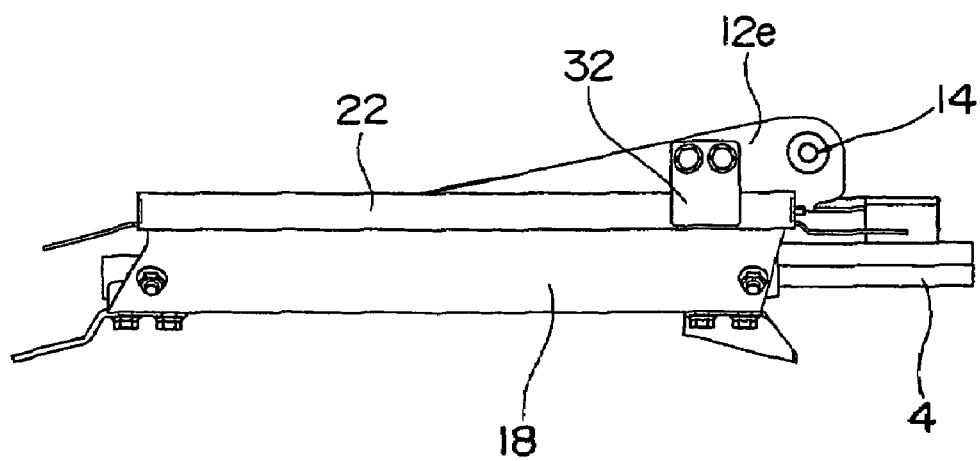
FIG. 5 is a side view of the slide adjuster of FIG. 2.

As best shown in FIG. 4, a planar auxiliary rail 16 is joined to a lower surface of the horizontally extending medial portion 12c of the set belt holding plate 12 so as to extend laterally outwardly.

A reinforcing plate 18 has a horizontally extending inner side portion 18a, which is joined to a lower surface of one of the U-shaped channels 8 that holds the lower rail 2 positioned on the central side of the vehicle body. The reinforcing plate 18 also has an inclined portion 18b extending laterally outwardly and obliquely upwardly from the inner side portion 18a, and a horizontally extending portion 18c extending laterally outwardly from the inclined portion 18b. An auxiliary rail guide 20 made of, for example, a resin is mounted on an outer side portion of the reinforcing plate 18, and a guide support 22 is secured to the outer side portion of the reinforcing plate 18 to support the auxiliary rail guide 20. The auxiliary rail guide 20 has a guide groove defined therein, in which an outer edge portion of the auxiliary rail 16 is loosely inserted.

Figure 6A:
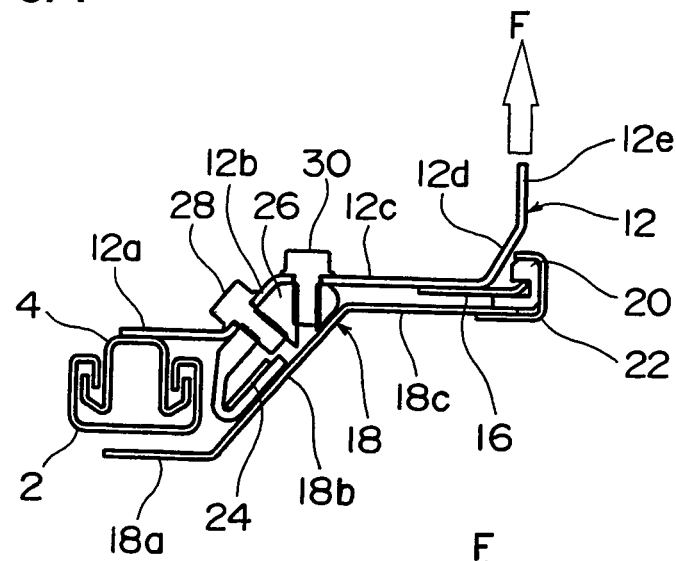
FIG. 6A is a sectional view taken along line VI-VI in FIG. 3, depicting the case where a load less than a predetermined value has been applied to a seat belt anchor through a seat belt.

As shown in FIG. 6A, the seat belt holding plate 12 and the reinforcing plate 18 have such a positional relationship that the first inclined portion 12b of the former and the inclined portion 18b of the latter extend parallel to each other, and the horizontally extending medial portion 12c of the former and the horizontally extending portion 18c of the latter extend parallel to each other.

Opposite ends of a belt 24 are secured to the inclined portion 18b of the reinforcing plate 18 confronting the seat belt holding plate 12, and a belt guide 26 having a guide groove defined therein, in which the belt 24 is loosely inserted, is secured to the first inclined portion 12b of the seat belt holding plate 12 by a bolt 28 and to the horizontally extending medial portion 12c of the seat belt holding plate 12 by a bolt 30. A guide support holding member 32 is secured to a portion of the vertical portion 12e of the seat belt holding plate 12 that is positioned laterally outwardly and obliquely upwardly of the belt guide 26. The guide support holding member 32 acts to prevent opening of the guide support 22 to thereby hold the guide support 22 in position.

In the slide adjuster of the above-described construction, front and rear ends of the lower rail 2 that is positioned on the side of a door are secured to the vehicle floor, and front and rear ends of the horizontally extending portion 18c of the reinforcing plate 18 are likewise secured to the vehicle floor, while the automobile seat A is secured to front and rear ends of the seat mounting frame 6 on the side of the door and to the front and rear overhangs 6a.

The operation of the slide adjuster of the above-described construction is explained hereinafter.

When the vehicle is running, the upper rail 4 is held on the lower rail 2 at the predetermined position by means of a known locking device. During a stop of the vehicle, if adjustments of the position of the seat are desired, the lock of the upper rail 4 with respect to the lower rail 2 is released by releasing the locking device, and subsequent application of a load to the seat in the longitudinal direction of the vehicle causes the upper rail 4 to slide along the lower rail 2. When the locking device is operated at a desired position, the upper rail 4 is again locked with respect to the lower rail 2, and the seat is held at such a desired position. During a sliding movement of the upper rail 4, the auxiliary rail 16 slides along the auxiliary rail guide 20 with the outer edge portion of the auxiliary rail 16 received in the guide groove in the auxiliary rail guide 20.

Further, when the vehicle is running, a portion (latch release) of a seat belt (not shown) that is retractable into, for example, a pillar of the vehicle body is latched in the seat belt anchor 14, thereby protecting the seat occupant in the event of a collision of the vehicle or the like.

More specifically, as shown in FIG. 6A, if a load F less than a predetermined value is applied to the seat belt anchor 14 in the direction indicated by an arrow due to, for example, a collision of the vehicle, the strength of the seat belt holding plate 12 withstands the load F and, at the same time, the strength of the reinforcing plate 18 similarly withstands the load F because the auxiliary rail 16 joined to the seat belt holding plate 12 is received in the auxiliary rail guide 20.

Figure 6B:
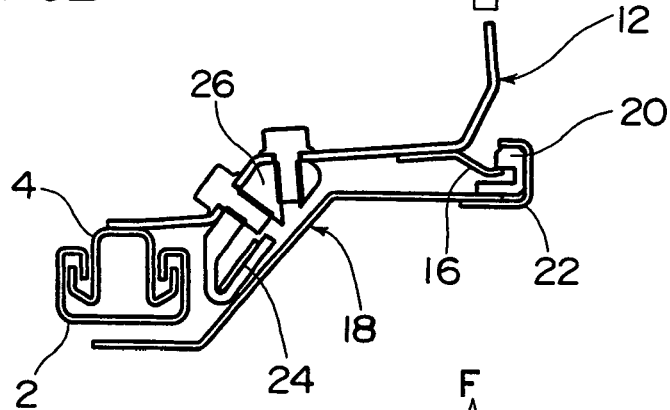
FIG. 6B is a view similar to FIG. 6A, but depicting the condition in which a load greater than the predetermined value has been applied to the seat belt anchor to thereby deform an auxiliary rail.
Figure 6C:
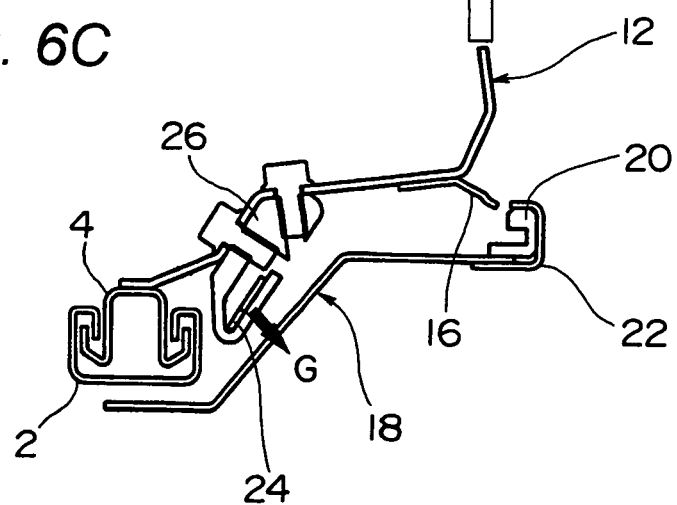
FIG. 6C is a view similar to FIG. 6A, but depicting the condition in which the auxiliary rail has been separated from its guide.

On the other hand, if a large load F greater than the predetermined value is applied to the seat belt anchor 14 to thereby gradually deform the auxiliary rail 16, as shown in FIG. 6B, it sometimes occurs that the auxiliary rail 16 is separated from the auxiliary rail guide 20. As shown in FIG. 6C, if the auxiliary rail 16 is separated from the auxiliary rail guide 20, a tension G is applied to the belt 24 inserted in the belt guide 26 to withstand the load F.

Because the slide adjuster according to the present invention can effectively increase the strength of separation between the seat belt anchor and the rail with a relatively small space without increasing the thickness of the lower rail or the upper rail, it can be effectively utilized in an automotive vehicle having a reduced space between the floor and the seat such as, for example, a one-box car, a truck and the like.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile slide adjuster comprising:
a lower rail adapted to be secured to a vehicle body;
an upper rail slidably mounted on the lower rail;
a seat belt;
a seat belt holding plate secured to the upper rail and having a seat belt anchor formed therewith to hold one end of the seat belt;
a reinforcing plate mounted to the lower rail to reinforce the seat belt holding plate; and
auxiliary rail joined to the seat belt holding plate and an auxiliary rail guide held by the reinforcing plate and having a guide groove defined therein, wherein a portion of the auxiliary rail is loosely inserted in the guide groove in the auxiliary rail guide.

2. The automobile slide adjuster according to claim 1, further comprising a belt mounted to the reinforcing plate and a belt guide secured to the seat belt holding plate to guide the belt.

3. The automobile slide adjuster according to claim 2, further comprising a guide support secured to the reinforcing plate to support the auxiliary rail guide and a guide support holding member secured to the seat belt holding plate to hold the guide support.

4. The automobile slide adjuster according to claim 3, wherein the guide support holding member is positioned laterally outwardly of the belt guide.

* * * * *